(No Model.) 2 Sheets—Sheet 1.

P. B. DELANY.
MEANS FOR ELECTRICALLY MAINTAINING SYNCHRONOUS MOVEMENTS.

No. 322,692. Patented July 21, 1885.

WITNESSES
Ed. A. Newman,
Cel. C. Newman.

INVENTOR
Patrick B. Delany
By his Attorneys
Baldwin, Hopkins & Peyton.

(No Model.) 2 Sheets—Sheet 2.

P. B. DELANY.
MEANS FOR ELECTRICALLY MAINTAINING SYNCHRONOUS MOVEMENTS.

No. 322,692. Patented July 21, 1885.

WITNESSES
Ed. A. Newman.
Al. C. Newman.

INVENTOR
Patrick B. Delany
By his Attorneys
Baldwin, Hopkins & Peyton.

UNITED STATES PATENT OFFICE.

PATRICK B. DELANY, OF NEW YORK, N. Y., ASSIGNOR TO THE STANDARD MULTIPLEX TELEGRAPH COMPANY, OF SAME PLACE.

MEANS FOR ELECTRICALLY MAINTAINING SYNCHRONOUS MOVEMENTS.

SPECIFICATION forming part of Letters Patent No. 322,692, dated July 21, 1885.

Application filed March 23, 1885. (No model.)

*To all whom it may concern:*

Be it known that I, PATRICK B. DELANY, of New York city, in the State of New York, have invented certain new and useful Improvements in Synchronous Movements for Telegraphy, of which the following is a specification.

In sundry Letters Patent of the United States granted to me on the 9th of October, 1883, I have shown and described an apparatus in many respects similar to that herein illustrated, and a specific description of that part of the apparatus disclosed in the patents is therefore unnecessary.

My present invention relates to a new means of effecting the correction of the apparatus so as to maintain its synchronous motion, and to means for keeping the line free from inductive or other electric disturbances.

Figure 1:
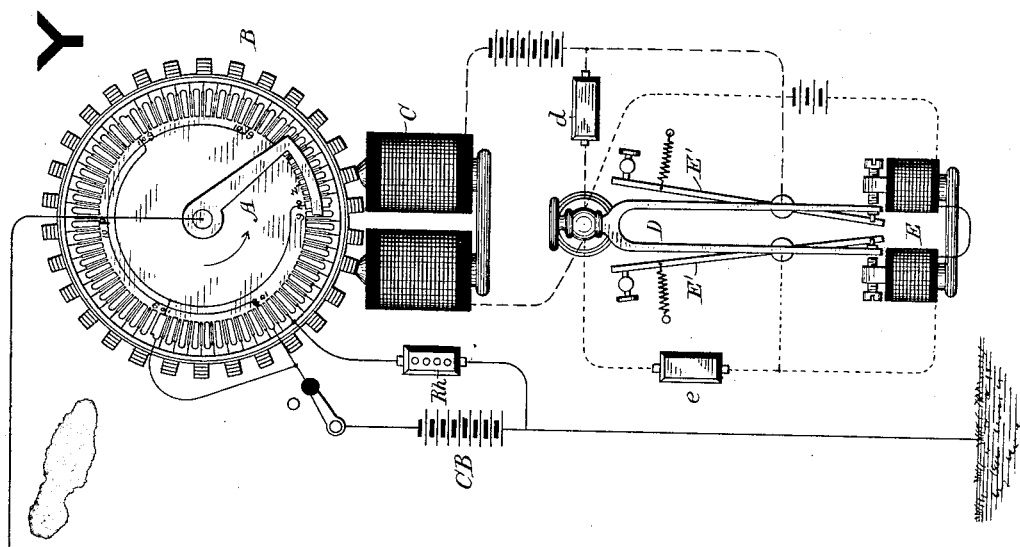
Figure 1:
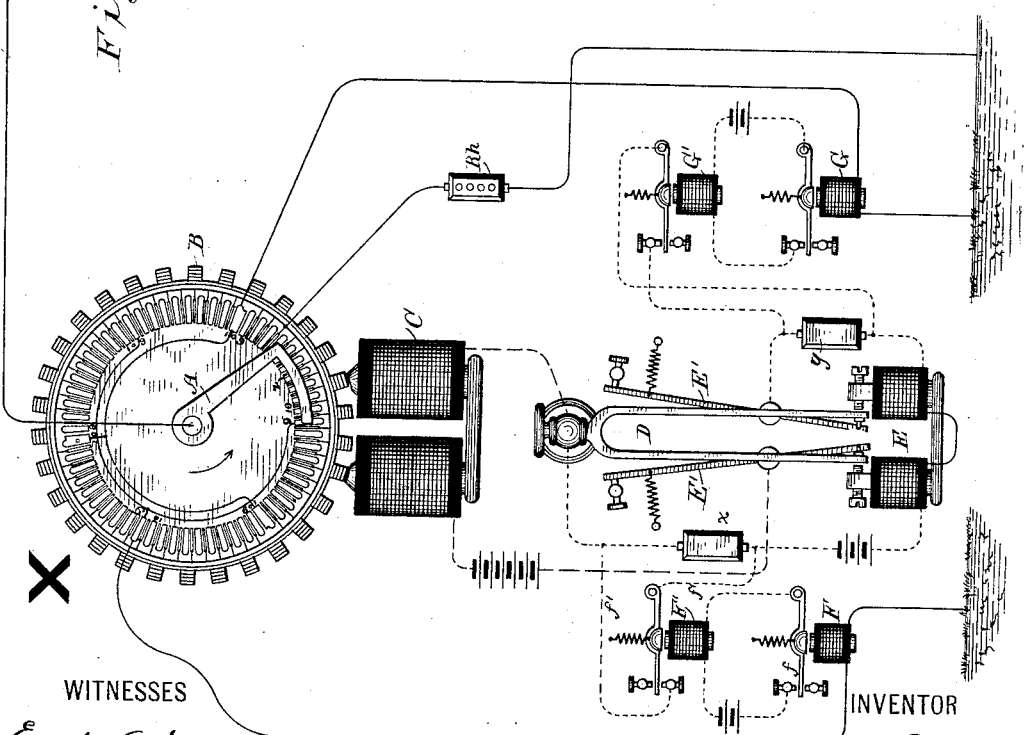
Figure 2:
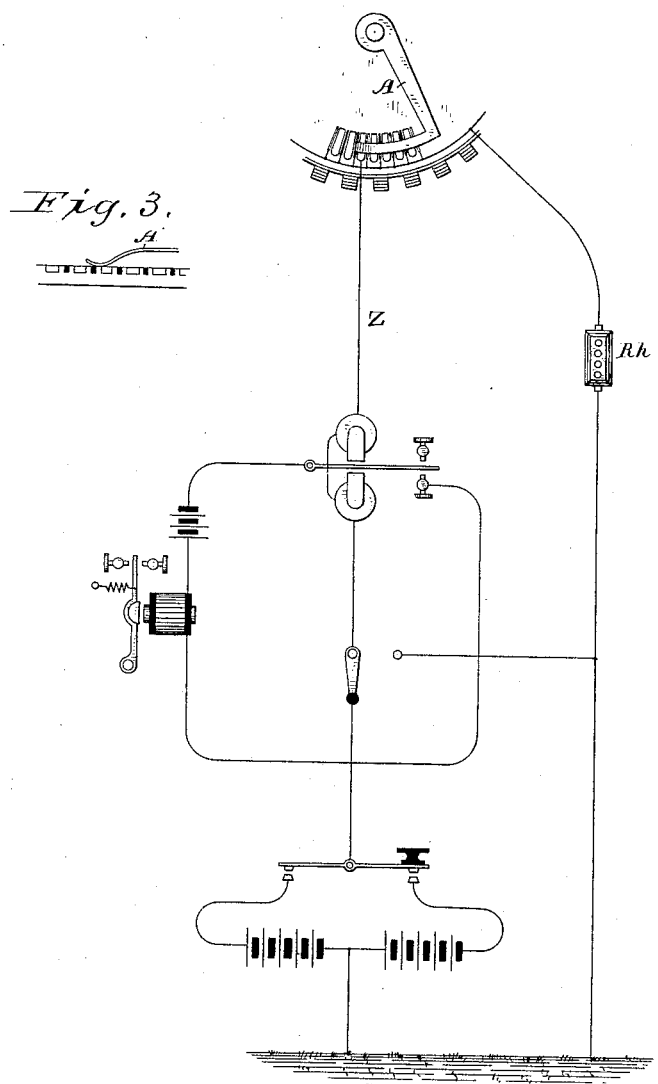
Figure 3:

In the accompanying drawings, Figure 1 is a diagram view showing my improved manner of effecting the synchronous corrections of the electrically-connected apparatus, and Figs. 2 and 3 are detached views showing the manner of eliminating static and other disturbances from the branch lines or operating-circuits at the stations.

Referring now to Fig. 1, X and Y represent two stations connected by a main line. At each station there is a table of contacts, over which a rotating circuit-completer or trailing-finger, A, traverses, which finger moves with the spindle of a toothed rotating armature-disk, B, driven by motor-magnets C. The circuit of these magnets is indicated by the broken line, and is rapidly interrupted by the vibrations of a fork, D, which is driven by a magnet, E, the circuit of which is indicated by the dotted line. The light contact-fingers, against which the fork vibrates to complete the two circuits just mentioned, are carried upon adjustable arms E'. Resistances *e d*, which are included in shunts around the contacts of the fork and motor circuits, are indicated at station Y, but are omitted at X, as they would have a tendency to confuse the drawings. This construction is precisely identical with that shown in my patents before mentioned, and more minute description is unnecessary.

In my present plan of maintaining synchronism one of the forks, vibrators, or circuit-interrupters is started into operation and permitted to run at its normal rate without any attempt at correction. This fork is located in this instance at station Y, and is adjusted in the manner hereinafter described, or in other suitable ways, so that its normal rate of vibration will be approximately equal to that of the fork at station X. The fork at Y, being thrown into vibration, will continue to vibrate, making and breaking its own circuit, as is well understood. The motor-magnet D will also be magnetized and demagnetized, so as to act upon the armature-disk to cause its continuous rotation, the disk having been started by an impulse of rotation imparted to it by the hand of the operator. The trailing-finger will therefore traverse over the circular table of contacts with a comparatively uniform speed.

On the table I have shown a number of independent insulated contacts which may be used for any purpose desired, and have also shown twelve contacts arranged in pairs at six equal intervals around the table. These latter contacts are numbered 9 and 10. The 9's are of normal width, but the alternate 10's at each station are preferably built out or extended toward the adjoining 9's. The arrangement is the same at both stations, except that the extended 10's at the two stations do not correspond in position with each other, but are arranged alternately with reference to each other. The 10's are extended, as is well understood from my previous patents, so that a variation of much less than the normal distance between two contacts will produce the proper correction of the apparatus, as will presently appear.

In my previous Patent No. 286,291 it has been explained that a weakening of the vibrator-circuit will cause an increase in the rate of vibration, while the elimination of resistance from the circuit or increase of electromagnetic force will cause the vibrator to vibrate more slowly. I make use of this method of correction in my present invention.

The main correcting-battery C B at station Y is connected with the three extended 10's, and also with the three 9's farthest removed from the extended 10's. At station X the 9's corresponding with those adjoining the extended 10's at Y are connected through a relay, F, to ground, while the extended 10's at X, which correspond with the unconnected 10's adjoining the battery-connected 9's at station Y, are connected through a relay, G, to earth. If the apparatus at each station is running and the rotator or circuit-completer at station Y should run faster than that at X, it will come upon an extended battery-connected 10, while the rotater at X is still upon the 9, which is connected to earth through the relay F. An impulse of electricity will therefore be sent from Y to X. It will energize the relay F, thus attracting its armature $f$ from its back-stop, break the local circuit of a magnet, F', and allow its armature to leave its front post, thereby opening a shunt, $f'$, around a resistance, $x$, in the fork-circuit of the vibrator. An increased resistance being thus thrown into the fork-circuit, the speed of vibration of the fork will be accelerated. On the other hand, should the rotater at Y run slower than that at X, a battery-impulse will be sent through a battery-connected 9 at station Y, while the rotater at station X has advanced upon an extended 10 at that station which is connected to earth through the relay G. The impulse thus sent over the line will energize the relay G and attract its armature from its back post, break the circuit of a local magnet, G', and allow its armature to fly to its back post, thus establishing a shunt around the resistance $y$ and cutting it out of the fork-circuit. The resistance in the fork-circuit being thus decreased, the fork will vibrate more slowly. This arrangement has many advantages. Among them are the following: The fork at Y is never disturbed, and the conditions are therefore most favorable to a uniform rate of vibration. At the same time the fork at X, being continually in a state of change, is more quickly influenced by a correcting-impulse. Furthermore, all the correcting-impulses come from one end of the line, and from one battery, and have therefore the same power in the correcting-relays. As all the correction and adjustment is accomplished at one end, the most efficient man may be at the head office X, where all adjusting and supervision of the apparatus is necessary. The operator at X, having the correcting-relays F G within hearing, or side by side on the same table, can tell with the greatest accuracy how the instruments are running, and by adjusting his instruments so that the accelerating and retarding impulses will about equal each other in number a most perfect balance may be maintained.

In my Patent No. 286,275 I have shown an arrangement in which all the correcting-impulses are sent out from one station, and act either to accelerate or retard the apparatus at the distant station, according as it runs fast or slow, and I do not therefore claim such an arrangement, broadly, in this application. It will be obvious, however, that the arrangement of contacts and correcting-battery and connections at station Y may be used in connection with any suitable apparatus at station X for making effective the impulses which are sent out when the apparatus at Y runs ahead of or behind that at X. It is also plain that the manner of accelerating or retarding may be employed in connection with a different arrangement of contacts for sending out the correcting and retarding impulses from one station to another.

In my application No. 122,054, filed February 26, 1884, and allowed September 27, 1884, I have shown an arrangement in which the vibrator at a station is accelerated and retarded by changing the condition of its circuit by cutting a resistance in or out; but in that arrangement only impulses of one kind— and they may be for acceleration or retardation—are made effective at the stations receiving the correcting-impulse, the corrections of the other character being made on the apparatus at that station when a correcting-impulse is sent out from it to the distant station.

In my Patent No. 286,273 I have shown what I call "static discharge-contacts" placed between the contacts on the table and connected through a common wire to the earth. The purpose of this arrangement, as set forth in that patent, is to discharge the line to ground after each completion of the circuit. I have found that where a resistance is used the line is effectively discharged, and the resistance prevents injurious short-circuiting of the battery from the branch lines through the bridging of the operating-segments and the discharge-contacts. I therefore employ a resistance, Rh, (shown as connected in the ground-line,) between the static discharge-contacts $z$ and earth.

In Fig. 2 I have indicated a section of the table of contacts, showing one operator's circuit connected with a single contact. The arrangement is the same as that shown in my Patent No. 286,278, granted October 9, 1883, and therefore needs no specific description.

As shown in Fig. 3, which is an edge view of a section of the table of contacts on an enlarged scale, the trailing-finger A is so shaped as to bridge between the line-discharge contacts and the main contacts. The bridging should be very slight. The advantage of this arrangement is that not only the main line is discharged to eliminate static and other disturbances through the ground-contacts to earth, but as the trailing-finger bridges from the main contacts, with which the operators are connected, to the ground-contacts there is a brief connection between the two, through which the branch or operators' circuits Z, Fig. 2, are put to ground to eliminate static and other disturbances. At the same time, as before remarked, the resistance in the ground-line prevents the injurious short-circuiting of the branch-line battery when the operator's key is put down.

I claim as my invention—

1. The combination of a main line, synchronously-actuated apparatus connected with each end of the main line, correcting devices at one end of the main line for accelerating or retarding the apparatus by varying the resistance of its controlling-circuit, a correcting-battery from which impulses of electricity are sent to operate said correcting devices, and contacts or devices at the apparatus at the end of the main line for completing the circuit from the correcting-battery to said correcting devices whenever the apparatus at the station to be corrected runs too fast or too slow.

2. The combination of a main line, synchronously-actuated apparatus at each end of the main line, devices for correcting the speed of the apparatus at one end of the line by increasing or decreasing the resistance of its controlling-circuit, a correcting-battery at the other end of the main line from which impulses of electricity are sent over the line to said correcting devices, battery-connected contacts at the battery-station, and circuit-completing contacts at the receiving-station connected with the correcting devices, whereby correcting-impulses are sent from the battery-station whenever the apparatus at the station to be corrected runs too fast or too slow.

3. The combination of a main line, synchronously-actuated apparatus, a table of contacts, and a circuit-completer which traverses said table at each end of the main line, the alternate battery-connected 10's at the battery-station, the alternate battery-connected 9's at the battery-station farthest removed from the battery-connected 10's, the 10-contacts at the other station arranged alternately with reference to the battery-connected 10's at the battery-station and connected with one correcting device, and the 9-contacts arranged alternately with reference to the battery-connected 9's at the battery-station and connected with the other correcting device.

4. The combination of the main line, synchronously-actuated apparatus connected at each end of the main line, the 9 and 10 contacts at one station, the alternate 10's being connected with one set of correcting devices, and the alternate 9's farthest removed from said connected 10's being connected with the other set of correcting devices, a correcting-battery, and the 9 and 10 contacts at the distant station corresponding with the unconnected 9 and 10 contacts at the first station connected to earth, whereby the correcting battery-circuit is completed to actuate the correcting devices whenever the apparatus runs out of time, as set forth.

5. The combination of the main line, the synchronously-actuated apparatus connected with each end of the main line, the arrangement and connection of the correcting contacts at the two stations, substantially as described, the correcting-battery at one station, and correcting devices at the other station for accelerating or retarding the apparatus at that station by means of impulses of electricity received from the battery-station whenever the apparatus at the station to be corrected runs too fast or too slow.

6. The combination of the main line, the table of contacts and traversing circuit-completer at each end of the main line, the 10-contacts on one table, the alternate contacts being extended toward the adjoining 9's and connected with the correcting-battery C B, the 9-contacts, those farthest removed from the extended 10's being also connected with the correcting-battery C B, the 10-contacts at the other station corresponding in position with the unconnected 10's at the battery-station and extended toward the adjoining 9's, and connected to devices for correcting the speed of the apparatus, and the 9-contacts corresponding with the unconnected 9's at the battery-station and connected with other devices for correcting the speed of the apparatus.

7. The combination of a main line, synchronously-actuated apparatus at each end of the main line, an uncontrolled vibrator or circuit-interrupter which is allowed to vibrate or act at its normal rate without correction for actuating the apparatus at one end of the main line, a correcting-battery and contacts for transmitting correcting-impulses of electricity, and correcting devices at the station to be corrected which correct the speed of the apparatus by acceleration or retardation by varying the resistance of the circuit of the controlling vibrator or circuit-interrupter at that station.

8. The combination of the main line, means for rapidly making and breaking the main-line circuit, a ground-line through which the main line is grounded after each completion of the circuit, and a resistance in the ground-line, for the purpose set forth.

9. The combination of a main line, synchronously-actuated apparatus connected with each end of the main line, a table of contacts and a rotating circuit-completer at each end of the line which traverses over the table of contacts and successively places the main line in connection with each of said contacts, static discharge-contacts arranged between the first-named contacts and connected together and to earth, and a resistance between the static discharge-contacts and the ground.

10. The combination of the table of contacts, the main contacts thereon, the ground or static discharge-contacts, the branch lines connected with the main contacts, and the trailing circuit-completer which bridges from the main contacts to the ground-contacts.

11. The combination of the branch line or lines, main and ground contacts, the bridging circuit-completer, and a resistance in the circuit or circuits completed by the bridging of the circuit-completer, substantially as set forth.

In testimony whereof I have hereunto subscribed my name.

PATRICK B. DELANY.

Witnesses:
  WM. W. WIGHT,
  GEO. A. SCOTT.